United States Patent
Kondo et al.

[11] Patent Number: 6,154,442
[45] Date of Patent: *Nov. 28, 2000

[54] MULTILAYERED OPTICAL INFORMATION-RECORDING MEDIA LAMINATED WITH THERMAL PLASTIC RESIN SHEETS AND PROCESS FOR MANUFACTURING THEREOF

[75] Inventors: Tetsuya Kondo; Akira Nishizawa, both of Kanagawa-ken, Japan

[73] Assignee: Victor Company of Japan, Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/619,426

[22] Filed: Mar. 21, 1996

[30] Foreign Application Priority Data

Mar. 24, 1995 [JP] Japan ................................... 7-091250

[51] Int. Cl.$^7$ ........................................................ G11B 5/66
[52] U.S. Cl. ............................................................ 369/286
[58] Field of Search .................................... 369/284, 286, 369/288, 275.1–275.5

[56] References Cited

U.S. PATENT DOCUMENTS

| | | | |
|---|---|---|---|
| 4,745,029 | 5/1988 | Kambour | 428/412 |
| 5,118,771 | 6/1992 | Inoue et al. | 526/262 |
| 5,328,816 | 7/1994 | Tamura et al. | 430/495 |
| 5,485,452 | 1/1996 | Maeda | 369/286 |
| 5,572,492 | 11/1996 | Ogawa | 369/288 |
| 5,618,638 | 4/1997 | Taki | 369/286 |
| 5,673,251 | 9/1997 | Suzuki et al. | 369/275.4 |

FOREIGN PATENT DOCUMENTS

| | | |
|---|---|---|
| 58-153244 | 9/1983 | Japan . |
| 59-148161 | 8/1984 | Japan . |
| 61-117748 | 6/1986 | Japan . |
| 63-298837 | 12/1988 | Japan . |

*Primary Examiner*—Brian E. Miller
*Attorney, Agent, or Firm*—Anderson Kill & Olick

[57] ABSTRACT

This invention provides an optical disk effective in both precision and productivity, and to a process for the manufacture thereof. The optical disk allows reading of the information recorded on each information-recording surface of the two or more information-recording surfaces by varying the focal position of a playback laser beam incident on and passing through said light transmitting substrate; and the optical disk is provided with a transparent layer that is laminated onto the light transmitting substrate and is constituted of a thermoplastic resin sheet of uniform thickness and the transparent layer has an information-recording surface other than the surface of said light transmitting substrate formed thereon.

4 Claims, 5 Drawing Sheets

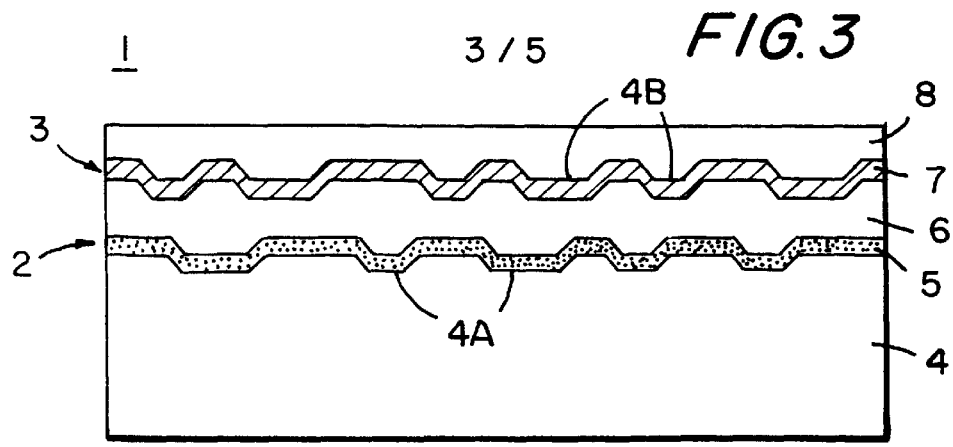
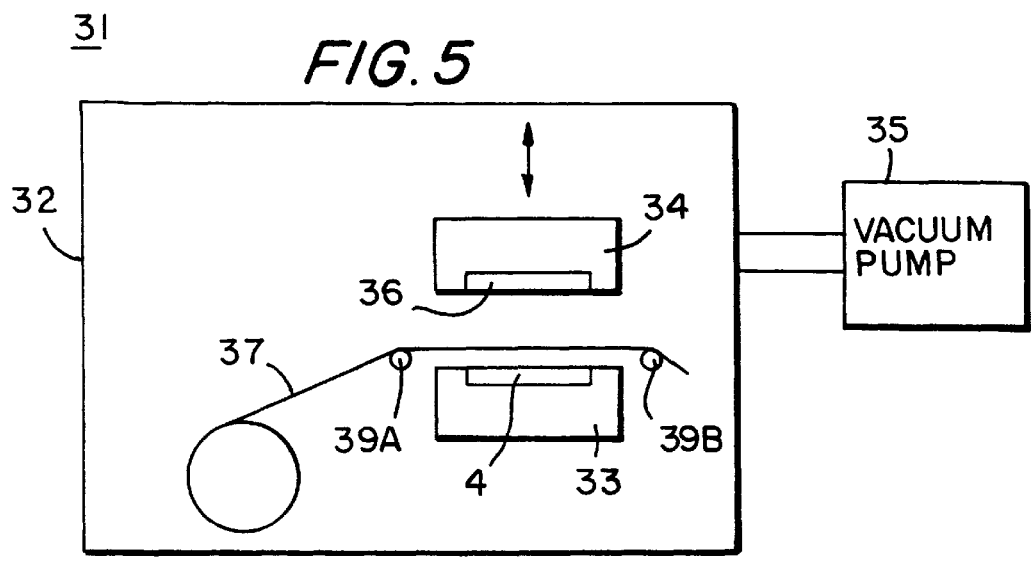
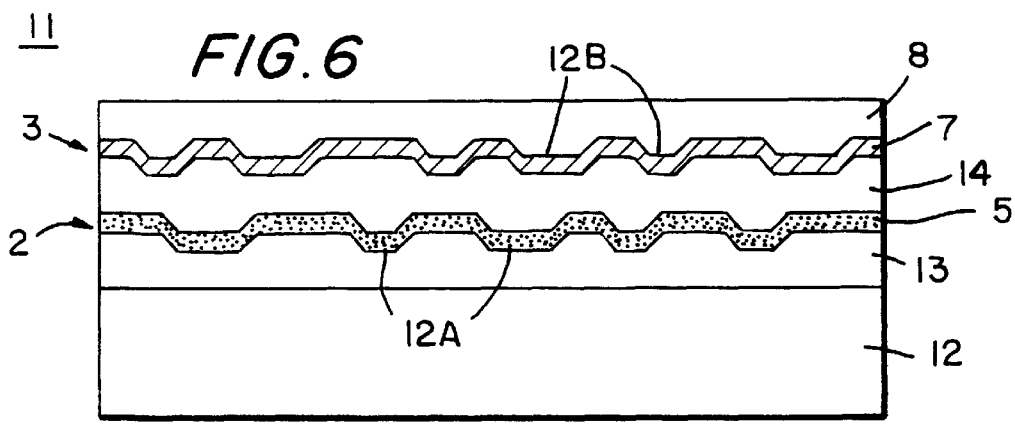

MULTILAYERED OPTICAL INFORMATION-RECORDING MEDIA LAMINATED WITH THERMAL PLASTIC RESIN SHEETS AND PROCESS FOR MANUFACTURING THEREOF

BACKGROUND OF THE INVENTION

1. Field of the Invention

This invention relates to a mutilayered optical information-recording medium (hereafter, optical disk) that has two or more information-recording surfaces in the thickness direction of a light transmitting substrate and a process for the manufacture thereof

2. Description of the Prior Art

Optical disks which record optically readable information and allow reading of the recorded information using a laser beam spot have heretofore been available. Optical disks including compact disks (CDs) and CD-ROMs have become widespread in use, particularly over the recent years.

CD-ROMs recently have come to be used not only in computers but also in multimedia game CD-ROMs and are increasingly replacing magnetic disks (floppy disks) and ROM cartridges both in computer and game applications. Furthermore, a high density CD version called the DVD (digital videodisk) is about to enter the field of movies and multimedia.

Recently proposals have been made of multilayered optical disks that enable the recording of massive quantities of information. In contrast to the conventional CD that has a single-layer information-recording surface in which information signals are recorded only on one surface thereof on a substrate, the mutilayered optical disks are structured to have a multiple number of information-recording surfaces in the thickness direction of the substrate.

Referring to FIG. 1, the aforementioned multilayered optical disk is now described below.

FIG. 1 is a drawing illustrating the structure of a conventional multilayered optical disk. FIG. 1 shows a partial cross-sectional view of the optical disk in its tracking direction.

As illustrated in FIG. 1, the conventional multilayered optical disk 101 has a first reflecting layer 105, a transparent layer 106, a second reflecting layer 107, and a protective layer 108 laminated together in this sequence onto a light transmitting substrate 104.

Crenulated pits 104A corresponding to information are generated on the substrate 104, and pits 104B corresponding to information are generated on the above transparent layer 106. In other words, the optical disk 101 has two information-recording surfaces in the thickness direction of the substrate 104, where the surface on which pits 104A are formed on the light transmitting substrate 104 is the first information-recording surface 102, and the surface on which pits 104B are formed on the light transmitting substrate 106 is the second information-recording surface 103.

The first reflecting layer 105 which is formed between the first information-recording surface 102 and the second information-recording surface 103 is made of a material with a certain degree of light transmittance to enable light to be incident on the second information-recording surface 103 or to be reflected.

If three or more information-recording surfaces are to be formed, a second transparent layer is formed on the second reflecting layer 107 on the above transparent layer 106, followed by forming the pits on the second transparent layer, generating a third recording surface, and a similar procedure is used to form a fourth information-recording surface and beyond.

Incident playback laser beam for reading information recorded on each of the above information-recording surfaces (102, 103) is directed through the underside of the above substrate 104. The playback light beam pickup is equipped to accurately recognize the spacing between adjacent information-recording surfaces, which may be as narrow as several tens of microns ($\mu$m), and to be focused onto the desired information-recording surface, so as to read out the information present on each information-recording surface.

As described above, the multilayered optical disk which is structured to have two or more information-recording surfaces in the thickness direction of substrate 104 can record a greater amount of information than can a conventional single layer structured optical disk.

Referring to FIG. 2, a conventional process for the manufacture of optical disk 101 having the above construction is described as follows.

First, as illustrated in FIG. 2(A), a stamper (not illustrated) with a pattern negative to pits 104 A on the first information-recording surface is used to mold, for example, by injection molding, an optical disk substrate 104 having pits 104A on its surface.

Then, as illustrated in FIG. 2(B), a first reflecting layer 105 is formed on the surface of substrate 104 having pits 104A formed thereon by a film-forming method such as sputtering, vacuum vapor depositing, spin coating or the like. It should be recalled that as mentioned above, the first reflecting layer 105 is a reflecting film that has a certain degree of light transmittance.

Then, a second information-recording surface is formed on top of the above first reflecting layer 105. The second information-recording surface is formed by the process well-known in the art as "the 2P process."

That is, as illustrated in FIG. 2(C), a stamper 141 with crenulated 141A pattern negative to pits 104B of the second information-recording surface is used, a UV-curable resin 142 is deposited as a droplet onto the first reflecting layer 105 of the above substrate 104, and then the stamper 141 is pressed at its signal-bearing surface against the substrate 104 having the UV-curable resin 142 deposited thereon so as to spread the UV-curable resin 142 to a uniform thickness.

Incidentally a nozzle (not illustrated) is used to suction off any resin that has overflown from the outer peripheral of substrate 104 as the stamper 141 is pressed.

Then, when the above UV-curable resin 142 is cured by irradiating UV from the substrate 104 side, followed by peeling off the stamper 141, an optical disk substrate is obtained on which is generated pits 104B that provide a second information-recording surface 103, as illustrated in FIG. 2(D).

Lastly, a second reflecting layer 107 is formed as a film of aluminum, gold, or the like, by sputtering or by vacuum film formation such as vacuum vapor deposition or the like, followed by forming a protective film 108 onto the second reflecting layer 107 and print a label (not illustrated) on the protective layer 108, thereby completing the formation of a multilayered optical disk as illustrated in FIG. 2(E).

It should be noted that the playback principle imposed on a multilayered optical disk as described above requires that the spacing between adjacent information-recording surfaces be under strict control. For example, a 40 $\mu$m thick film spacing between adjacent information-recording surfaces allows a variation in thickness of only about ±2 μm.

However, "the 2P process" mentioned above even with improved precision could achieve at best a level of ±5 μm. In addition, "the 2P process" is inferior in productivity relative to that of injection molding, requiring as long as 2 minutes per surface for molding a second and subsequent information-recording surfaces.

It may be possible to increase in practice the molding rate of "the 2P process", but that would lead to problems such as reduced film thickness precision, trapping of air bubbles, unsatisfactory suction-removal of the resin overflow, and the like.

That is, manufacture of the above multilayered optical disk by a conventional manufacturing process would be plagued with problems in terms of both precision and productivity.

BRIEF SUMMARY OF THE INVENTION

1. Object of the Invention

This invention relates to a multilayered optical disk with two or more information-recording surfaces in the thickness direction of a light transmitting substrate, and aims to provide a multilayered optical disk effective in terms of both precision and productivity and a process for the manufacture thereof 2. Brief Summary The first aspect of this invention provides an optical information-recording medium that has at least two or more information-recording surfaces in the thickness direction of a light transmitting substrate and that allows reading of the information recorded on each information-recording surface of the two or more information-recording surfaces by varying the focal position of a playback laser beam incident on and passing through said light transmitting substrate comprising:

a transparent layer that is laminated onto said light transmitting substrate and is constituted of a thermoplastic resin sheet of uniform thickness; wherein an information-recording surface other than the surface of said light transmitting substrate is formed on said transparent layer.

Also, the second aspect of this invention provides a process for the manufacture of an optical information-recording medium that has at least two or more information-recording surfaces in the thickness direction of a light transmitting substrate and that allows reading of the information recorded on each information-recording surface of the two or more information-recording surfaces by varying the focal position of a playback laser beam incident on and passing through said light transmitting substrate comprising:

a first step in which a thermoplastic resin sheet of uniform thickness is positioned between said light transmitting substrate and a stamper having a crenulated pattern formed thereon corresponding to pits or guide grooves; and a second step in which said light transmitting substrate and said stamper are heated, followed by pressing the light transmitting substrate and stamper against said thermoplastic sheet, thereby transferring the crenulated pattern formed on said stamper to the surface of said thermoplastic resin sheet and forming an information-recording surface on a surface other than that of said light transmitting substrate.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 3 is a drawing illustrating the structure of an optical disk of a first example of this invention;

FIG. 5 is a schematic view for the essential parts of a molding device for the optical disk of this invention which is shown in FIG. 1;

FIG. 6 is a drawing illustrating the structure of an optical disk of a second example of this invention.

DETAILED DESCRIPTION OF THE INVENTION

Figure 1:
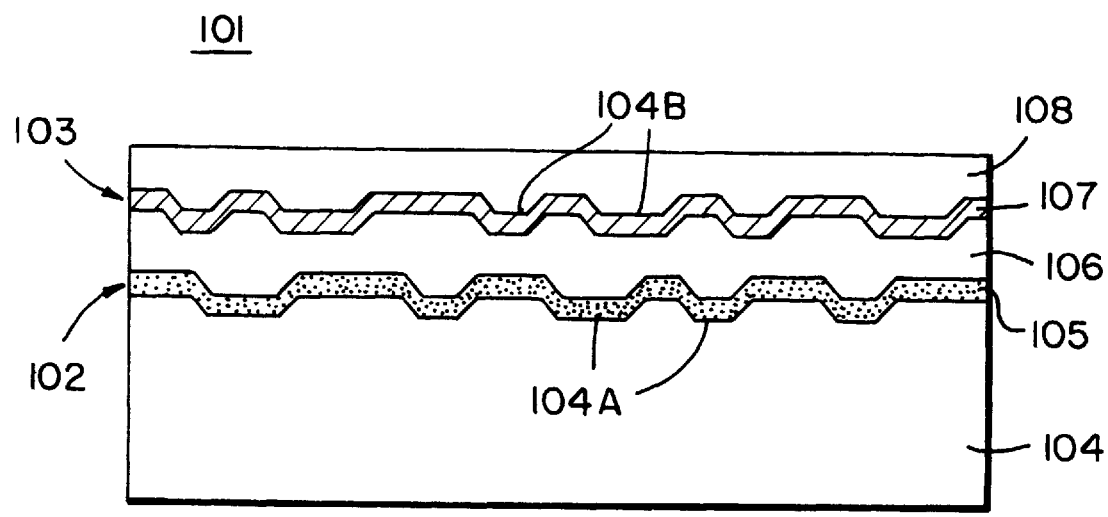
FIG. 1 is a drawing illustrating a conventional multilayered optical disk.
Figure 2A:
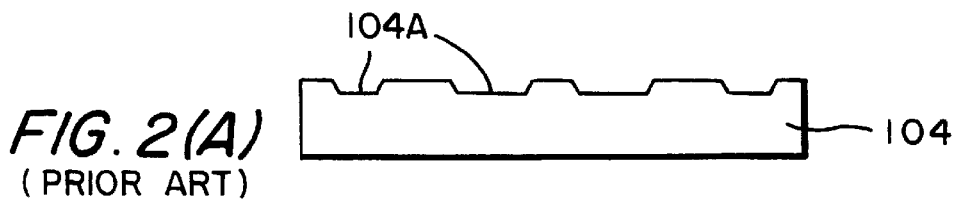
FIGS. 2A–2E is a drawing illustrating an embodiment of a process for the manufacture of a conventional multilayered optical disk.
Figure 2B:
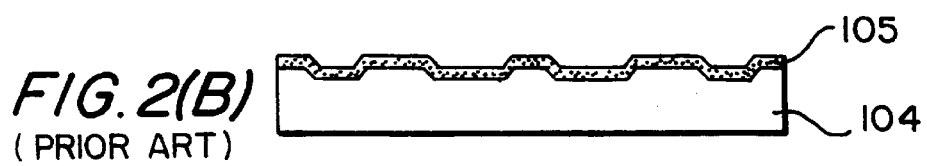
Figure 2C:
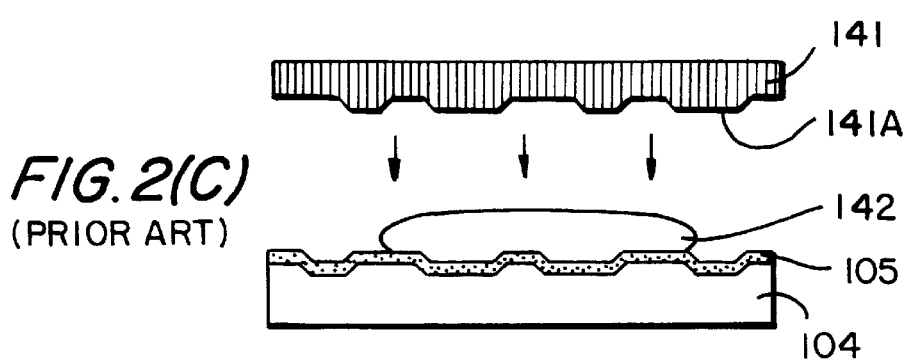
Figure 2D:
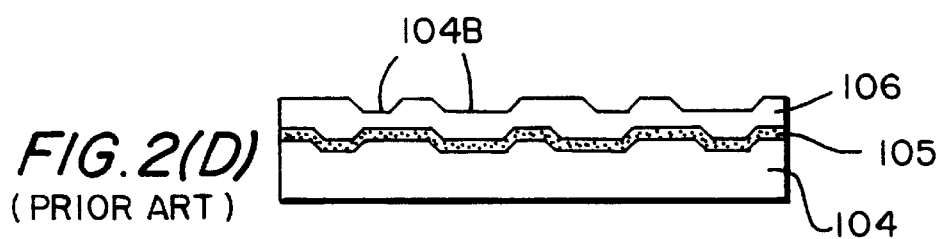
Figure 2E:
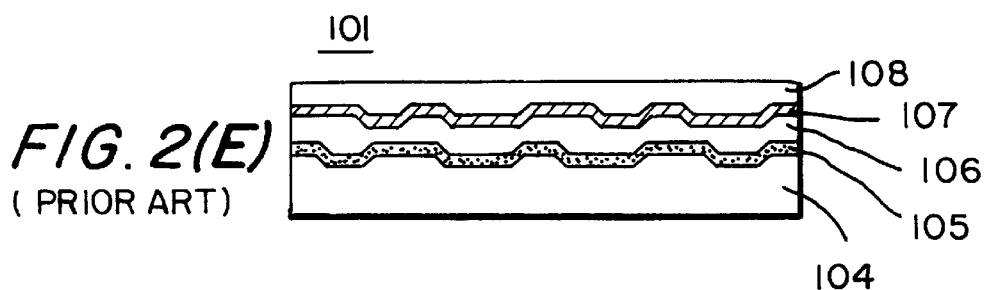

Examples of this invention are described below referring to the attached drawings.

Example 1 for Optical Disk

First, the structure of an optical disk of this invention is described using FIG. 3. FIG. 3 illustrates part of the cross-sectional view of an optical disk in its tracking direction. For simplification, the multilayered optical disk described below will be one with two information-recording surfaces.

As shown in FIG. 3, the optical disk 1 of this Example has a first reflecting layer 5, a transparent layer 6, a second reflecting layer 7, and a protective layer 8 laminated together in this sequence on a light transmitting substrate 4.

On substrate 4 are formed crenulated pits 4A corresponding to information; on the above transparent layer are formed crenulated pits 4B corresponding to information. That is, the optical disk 1 has two information-recording surfaces in the thickness direction of the substrate 4, wherein the surface on which the pits 4A of the above light transmitting substrate 4 are formed is the first information-recording surface 2, and the surface on which the pits 4B of the above transparent layer 6 are formed is the second information-recording surface 3.

In addition, a first reflecting layer formed between the first information surface 2 and the second information-recording surface 3 is made of a material that has a certain degree of light transmittance, so as to permit light to be incident on the second information-recording surface 3 or to be reflected.

If three or more information-recording surfaces are to be formed, a second transparent layer is formed on the second reflecting layer 7 on the above transparent layer 6, and pits are formed on the second transparent layer to make a third information-recording surface, and fourth and subsequent information-recording surfaces can be similarly formed.

A notable aspect of the above optical disk 1 is that a thermoplastic resin is chosen as the material for constructing the transparent layer 6. This is because a thermoplastic resin sheet is used to manufacture the optical disk 1 to be described later.

The thermoplastic resin sheet that constitutes the transparent layer 6 is chosen, for a playback principle, from those that have a double pass birefringence of not more than ±50 nm, preferably not more than ±30 nm. This choice is made because as the double pass birefringence increases beyond ±50 nm, the resultant optical distortion will increasingly degrade playback signals, thereby increasing error rates. Therefore, the material to be used as the thermoplastic resin sheet is preferably an acrylic resin (PMMA i.e. polymethyl methacrylate), polycarbonate resin(PC), or an amorphous polyolefin resin.

A thermoplastic resin sheet equal to or less than 20 μm in film thickness would reduce ease of handling and also tend to wrinkle during molding. Since the film thickness of the above transparent layer 6 is nearly equal to that of the thermoplastic resin sheet used, it would be difficult for a light pickup of a playback device to track if the thermoplastic resin sheet were 100 μm or thicker. This, in turn, could require a more complicated mechanism for the light pickup, making it undesirable to use any thermoplastic resin sheet film thicker than 100 μm. Therefore, the film thickness of the thermoplastic sheet used should be about 20 μm to about 100 μm, preferably about 25 μm to about 75 μm so as to result in transparent layer 6 with a film thickness of about 20 μm to about 100 μm.

Incident playback laser beams for reading the information recorded on each of the information-recording surfaces thus constructed on the optical disk 1 are directed from the underside of substrate 4. The light pickup of a playback device can accurately recognize the spacing between the adjacent information-recording surfaces, in which the spacing may be as narrow as several tens of microns (μm), and are focused onto the desired information-recording surface, so as to allow reading out the information on each information-recording surface.

Since the information-recording surface (second information-recording surface 3) on a surface other than that of substrate 4 is formed on transparent layer 6 which is constituted of a thermoplastic resin sheet with a double birefringence within ±50 nm and a uniform film thickness in the range of about 20 μm to about 100 μm it is possible to produce an optical disk in which the degradation of playback signals due to an optical distortion is slight and the variation in spacing between the adjacent information-recording surfaces is very low.

That is, the variation in the film thickness of transparent layer 6 is about equal to that of the thermoplastic resin, so that the use of a thermoplastic resin sheet of uniform film thickness will allow the variation in the spacing between the adjacent information-recording surfaces to fall within the allowable range. Therefore, this construction will lead to a reduction in errors due to a variation in spacing between the adjacent information-recording surfaces and also to a reduction in requirements for the construction of a playback device.

Example 1 of a Process for the Manufacture of an Optical Disk

Next, the process for the manufacture of the above optical disk 1 is described.

FIG. 4 is a drawing illustrating an embodiment of the process for the manufacture of the optical disk of this invention shown in FIG. 3. For simplicity, the description is made of a two-layered disk.

Figure 4A:
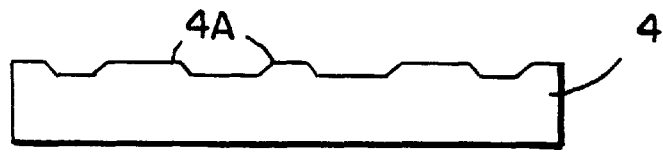
FIGS. 4A–4E is a drawing illustrating an embodiment of a process for the manufacture of the optical disk of this invention which is shown in FIG. 1.

As illustrated in FIG. 4(A), an optical disk substrate 4 with pits 4A on the surface thereof is molded, for example, by injection molding using a stamper (not illustrated) with a pattern negative to pits A of the first information-recording surface.

Figure 4B:
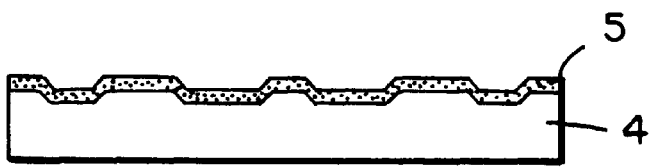

Next, as illustrated in FIG. 4(B), a first reflecting layer 5 is formed on the surface on which are formed pits 4A of substrate 4 by a film-forming method such as sputtering, vacuum vapor depositing, spin coating, or the like. As described above, the first reflecting film is a reflecting layer having a certain degree of light transmittance.

Then, a second information-recording surface is formed on the first reflecting layer using a molding device 31 as illustrated in FIG. 5. FIG. 5 is used to explain the molding device 31.

FIG. 5 is a schematic drawing showing essential parts of the optical disk molding device shown in FIG. 3.

As shown in FIG. 5, the inside of a vacuum chamber 32 of the molding device for the optical disk 1 is constructed in a way that allows adjustment to a specific vacuum level by means of a vacuum pump 35.

Molds 33 and 34 are also positioned in the vacuum chamber 32. The mold 33 is fixed in the vacuum chamber 32 and is used to mount substrate 4 having the first information-recording surface 2 thereon. Onto the mold 34 is mounted a stamper 36 to form the second information-recording surface 3. The mold 34 is mounted movably in the vertical direction in the vacuum chamber 32 in such a way that it can move the mounted stamper 36 while holding it horizontally until the stamper 36 comes into contact with the substrate 4 mounted on the above mold 33.

In addition, thermoplastic resin sheet 37 which is used to generate a transparent layer 6 is unfolded and positioned between the molds 33 and 34. As described above, the thermoplastic resin sheet 37, which is constituted of a thermoplastic resin material having a double pass birefringence of not more than ±50 nm, has a uniform film thickness in the range of about 20 μm to about 100 μm, is in continuous sheet form wider than the diameter of the above substrate 4, and is stored as a wound roll, as illustrated by FIG. 5, within the vacuum chamber 32 (or outside of the vacuum chamber 32). The wound thermoplastic resin sheet 37 is unwound to a suitable length and unfolded to be held, via guide rollers 39A and 39B, between the mounted substrate 4 and the stamper 36.

Furthermore, the substrate 4 mounted on mold 33 and the stamper 36 mounted on mold 34 are equipped with heaters, which are not illustrated, and the thermoplastic resin sheet 37 is equipped with a means for heating, not illustrated, such as an indirect infrared heater so that these can be heated to any designated temperatures. This setup is made so as to melt the surface of the thermoplastic resin sheet 37 when the stamper 36 is pressed against the sheet as will be described later.

Thus, substrate 4, stamper 36, and thermoplastic resin sheet 37 are each heated so that the thermoplastic resin sheet 37 should not come in contact with, but be apart from, the surfaces of the molds 33 and 34, the mounted substrate 4, and the stamper 36. It is preferred to keep the thermoplastic resin sheet under some tension in the lengthwise direction so as to prevent the thermoplastic resin sheet 37 between molds 33 and 34 from slacking between guide rollers 39A and 39B.

Stopping the heating by the above heating means will allow the thermoplastic resin sheet 37 to cool and solidify, where some cooling means may be provided to facilitate cooling the thermoplastic resin sheet 37.

Figure 4C:
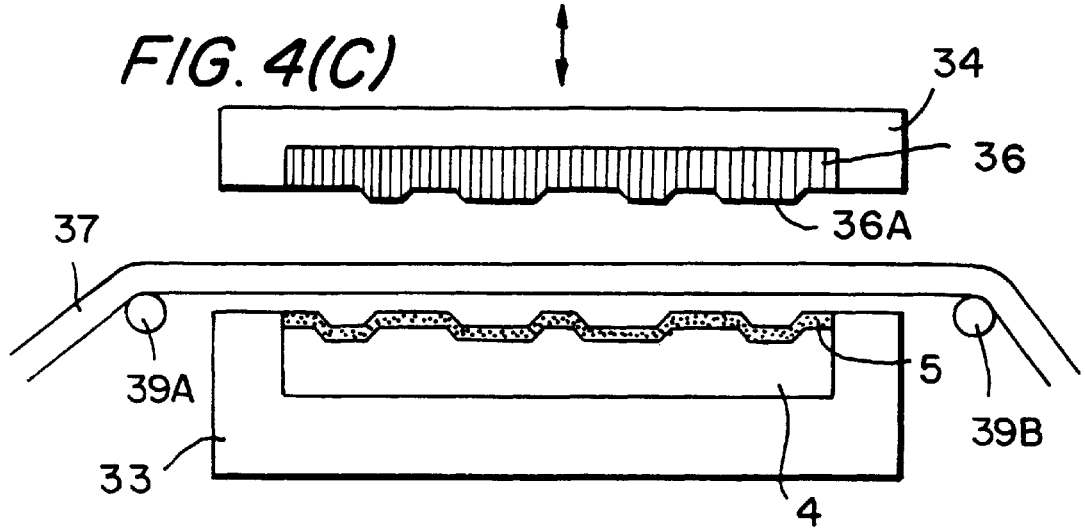
Figure 4D:
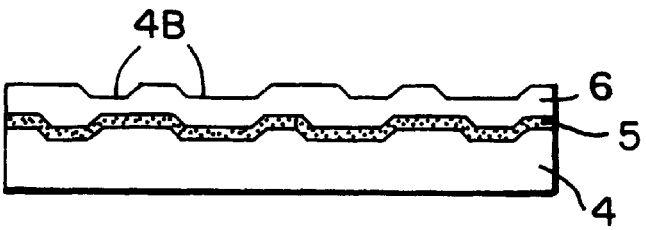

As illustrated in FIG. 4(C), the substrate 4 on which the first reflecting layer is formed is mounted on mold 33, and the stamper 36 having crenulated pits 36A formed with a pattern negative to pits 4B of the second information-recording surface 3 is mounted on mold 34. As also shown in FIG. 4(C), the substrate 4 is mounted with its surface having the first reflecting layer 5 formed thereon (the first information-recording surface 2) upward, and the stamper 36 is mounted with its surface having a crenulated pattern 36 A formed thereon downward. As described above, thermoplastic resin sheet 37 is positioned between the mounted substrate 4 and the stamper 36.

Then, the inside of the vacuum 32 is brought to a specific level of vacuum, and mold 34 is moved downward so as to interpose the thermoplastic resin sheet 37 between the substrate 4 and the stamper 36 and to apply a specified pressure. Since the substrate 4, the stamper 36, and the thermoplastic resin sheet 37 are each heated, the two surfaces of the thermoplastic resin sheet 37 will melt. The two molten surfaces allow pits 4B to be transferred to that surface of thermoplastic resin sheet 37 in contact with the stamper and the other surface thereof in contact with the substrate 4 to be adhered to substrate 4. After applied heat and pressure is held for a given period of time, followed by suitably cooling to solidify the thermoplastic resin sheet 37, the stamper 36 is peeled off, and the thermoplastic resin sheet 37 is cut along the outer edge of substrate 4, as shown in FIG. 4 (D), resulting in the formation of a substrate having pits 4B of the second information-recording surface 3 formed on the surface thereof.

Figure 4E:
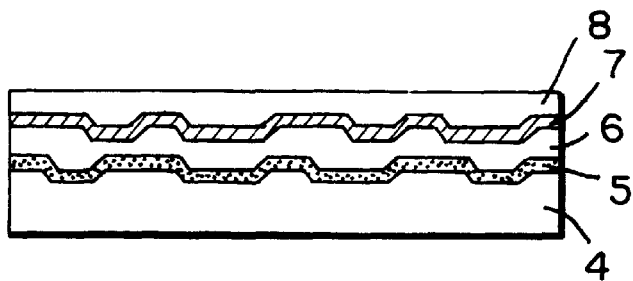

The formation of the optical disk 1 is completed (FIG. 4(E)) by forming a film of aluminum, gold, or the like on the transparent layer 6 on which pits 4 have been formed by means of vacuum film formation such as sputtering, vacuum vapor depositing, or the like, thereby forming a second reflecting layer 7, by spin coating on the second reflecting layer 7 with a film of a UV curable resin or the like to form a protective layer 8, and then by printing a label (not illustrated) on the protective layer 8.

The optical disk as manufactured as above will have the spacing between adjacent information-recording surfaces to be nearly identical to the thickness of the original thermoplastic resin sheet 37. Since the thermoplastic resin sheet 37 has a variation in film thickness of about ±1 μm, the spacing between the adjacent information-recording surfaces can also be achieved at a similar magnitude of variation. This construction can eliminate a need for a rigorous control of the spacing between adjacent information-recording surfaces, which will lead to shortening of the time needed in the molding steps to form a second information-recording surface 3 and will also allow manufacturing a multilayered optical disk with a very low variation in spacing between adjacent information-recording surfaces (the variation in film thickness of transparent layer 6).

Although the above description of the process calls for molding the thermoplastic resin sheet 37 in a vacuum, it would obviously be possible to mold without a vacuum. Nevertheless, molding the thermoplastic resin sheet 37 in a vacuum offers some advantages. Such an operation will allow the sheet 37 to be uniformly laminated without any chance of trapping air bubbles at the moment when the sheet 37 and the stamper 36, and the substrate 4 and sheet 37, are joined together at the interfaces. Uneven lamination, if any, would result in film thickness irregularities for the transparent layer 6, causing an out-of-focus problem, but sheet molding in a vacuum can avoid such problems and provide a uniform lap even for a large diameter disk.

Example 2 for an Optical Disk

As shown in FIG. 6, both the first and second information-recording surfaces may be formed by molding thermoplastic resin sheet 37.

The first information-recording surface 2 of an optical disk 11 is formed in the same manner as that of the second information-recording surface of the above optical disk 1. That is, a mirror-surface substrate 12 free of any crenulated features made by pits or the like is mounted on mold 33 of the above molding device; a stamper used to form pits 12A of a first information-recording surface is mounted on mold 34 and is pressed with heat in the manner described above to transfer the pits 12A, followed by cooling and cutting out the thermoplastic resin sheet 37 into a first transparent layer 13. A first reflecting layer 5 is formed on the first transparent layer 13, followed by forming sequentially, as in the optical disk 1, a second transparent layer 14, a second reflecting layer 7, and a protective film 8, thereby generating optical disk 11.

Example 2 of a Process for the Manufacture of an Optical Disk

A reflecting film may be precoated to one surface of the above thermoplastic resin sheet in the above process for the manufacture of optical disks 1 and 11, which are shown in FIG. 3 and FIG. 6, respectively.

Figure 7A:
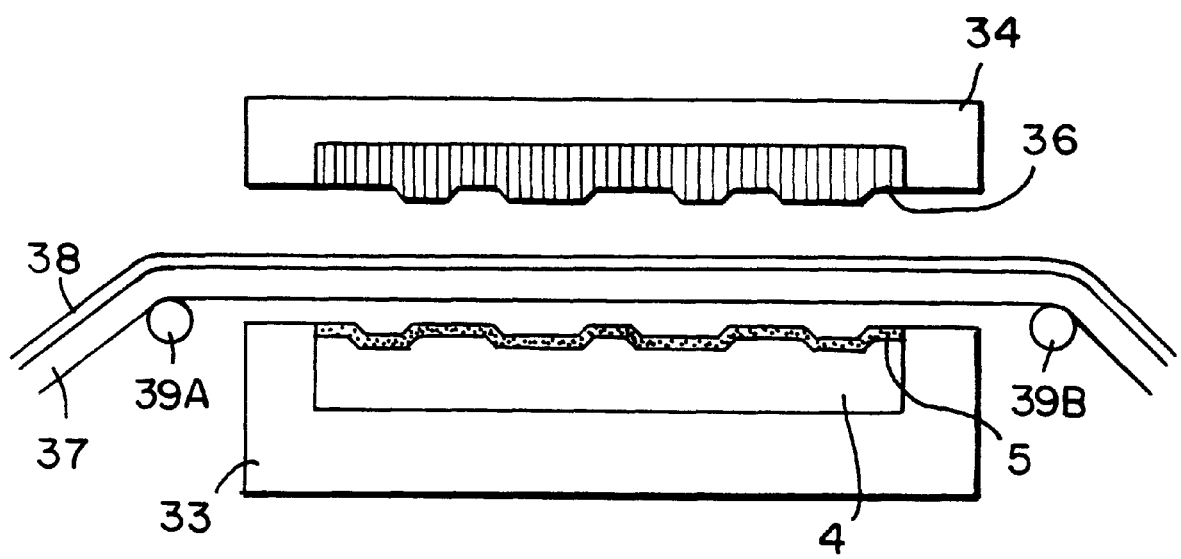
FIGS. 7A–7B is a drawing illustrating another embodiment of a process for the manufacture of the optical disk of this invention which is shown in FIG. 1.
Figure 7B:
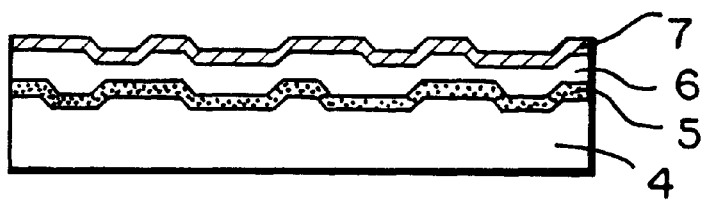

As illustrated in FIG. 7 (A), a reflecting film 38 is precoated to one surface of the thermoplastic resin sheet 37, and the sheet is placed to position the side having the reflecting film 38 formed thereon to face the stamper 36. The reflecting film 38 coated to the thermoplastic resin sheet 37 becomes upon molding a second reflecting layer 7. When the thermoplastic resin sheet 37 having the reflecting layer coated thereto is processed with heat and pressure as described above and rapidly cooled, the pattern of crenulated pits 36A of the stamper 36 is transferred to the surface of the thermoplastic resin sheet 37 having the reflecting film 38 formed thereon. Cutting out the molded thermoplastic resin 37 along the outer periphery of substrate 4 results in the formation of a transparent layer 6 having the reflecting layer coated thereto, thereby forming a second information-recording surface 3. Formation of a protective film 8 on the second reflecting layer 7 on the transparent layer 6 gives optical disks 1 and 11.

If it is necessary to have different reflecting layers depending on the information-recording surfaces to be formed, thermoplastic resin sheets with different reflecting films coated thereto may be prepared in several types so as to permit selection of the type appropriate to the information-recording surface to be formed.

Since the film of the reflecting layer is formed in a vacuum, it is possible to integrate the film-forming device of the reflecting layers into the vacuum chamber of the molding device 31. This will permit forming the reflecting layer film and moving to the molding step without removing it out into the atmosphere in a one-pass equipment operation to consolidate the film formation and molding and will improve the productivity by an order of magnitude.

Optical disks in these examples of this invention are now described in more detail using specific experimental examples as below:

EXPERIMENT EXAMPLE 1

Two pieces of nickel stamper with digitized image signals inscribed thereinto in a 0.84 μm track pitch and a pit length 0.45 μm or longer were used. One of them was used to produce a first information-recording surface by injection molding polycarbonate, thereby forming a substrate 4 with a 120 mm diameter and a 1.2 mm thickness having pits 4A of the first information-recording surface formed thereon. A high transmitting first reflecting layer 5 was formed on the surface of the substrate 4 having the formed pits.

Then, the substrate was mounted on mold 33 of the above molding device 31 not equipped with either the above vacuum chamber 32 or vacuum pump 35. The mold 33 was heated to 70° C. Acrylic resin (PMMA) sheet (thermoplastic sheet) 37 with a double pass birefringence in the plane of not more than ±15 nm was used, which was available as a 15 cm wide and 500 m length cut roll with a film thickness of 50 μm (film thickness variation range ±1 μm). This sheet was unfolded over the substrate 4.

Mold 34 with stamper 36 to be used to form a second information-recording surface 3 was positioned to face substrate 4 in the mold 33. Incidentally, the pit-formed surface of substrate 4, sheet 37, the underside of stamper 36 were held parallel to, and apart from, each other.

The surface of the stamper 36 was heated to 85° C. and the sheet 37 in the atmosphere was indirectly infrared-heated (not illustrated) to 75° C. Then, mold 34 was moved to press against mold 33 and was held for 5 seconds to compress the sheet 37 interposed between the molds. The mold 33 was then rapidly cooled to 50° C. and the mold 34 down to 60° C. and the sheet 37 was cut out along a 120 mm outer diameter by a circular blade (not illustrated) placed at an outer periphery of mold 33, followed by separating the molded substrate from the original sheet 37. Then, the two molds were opened to remove the substrate adhered to mold 33. The completed substrate had pits 4B of the second information-recording surface formed thereon in a 50 μm spacing apart from, and parallel to, the first information-recording surface 2. The total molding time to form the transparent layer 6 to produce the second information-recording surface was 30 seconds.

A second reflecting layer (aluminum) 7 was sputtered to a film thickness of 70 nm onto the above transparent layer 6, followed by spin coating the layer with SD-11 (manufactured by Dainippon Ink & Chemicals, Inc.) to an 8 μm thick protective film 8, and the layer was then UV-cured. Lastly a label was printed over it to complete the manufacture of the optical disk 1.

The optical disk 1 was evaluated for playback using a disk tester equipped with a laser wavelength of 635 nm and an objective lens with a numerical aperture, NA0.52. Signals from the two surfaces were individually observed by changing the focal position of the pickup, and it was found that eye patterns were cleanly open in the both layers to permit stable playback. Playback jitter was 15% for the first layer and 12% for the second layer, indicating highly usable levels if operated in conjunction with an equalizer.

EXPERIMENT EXAMPLE 2

This example used a rolled acrylic resin sheet (thermoplastic resin sheet) with one surface having a 70 nm film of a second reflecting layer aluminum) 7 precoated thereto (See FIG. 7(A)). This was used to replace the acrylic sheet used in Example 1 and molded with the aluminized surface to come in contact with stamper 36. In this case, an operation similar to that of Example 1 was followed to fabricate a disk substrate, except that the inside of the vacuum chamber 32 of molding device 31 was held at 1 torr. Since the molded transparent layer 6 in this experiment example had already been aluminized, the formation of the second reflecting layer 7 was omitted, and a protective film 8 was spin coated over it to complete the manufacture of an optical disk 1.

A similar playback testing of this example also confirmed a stable playback performance.

The optical disk in the above Experiment Example 1 may be sheet-molded in a vacuum; similarly, the optical disk in the Experiment example 2 may also be sheet-molded without the use of a vacuum.

Although the above examples and Experiment examples were described exclusively on read-only optical disks as illustrative examples, this invention is not limited to such applications, and can be applied to once-writable and rewritable type disks as well as to optical cards and other optical information-recording media. When the application to optical information-recording media involves a once-writable or rewritable type, the stamper 36 forms preformatting information such as guide grooves, and the like.

In addition, further applications may be made, such as the formation of an antistatic layer on the underside of substrate 4 or the upper side of protective film 8 or printing of a label on the uppermost protective film 8.

Advantageous Effect of the Invention (1) According to the optical disk of this invention, a multilayered optical disk can be obtained with very little degradation of the playback signal caused by optical distortions and with a very low variation in spacing between adjacent information recording surfaces. That is, since the variation in film thickness of the transparent layer is about equal to that of the thermoplastic resin sheet, use of a uniform thickness thermoplastic resin sheet permits bringing the variation in spacing between adjacent information-recording surfaces to an allowable range of error.

Therefore, this construction can reduce error rates caused by the variations in spacing between adjacent information-recording surfaces and also to reduce the burden of requirements on the playback device to be used.

(2) The optical disk manufacturing process of this invention eliminates a rigorous control of the spacing between adjacent information-recording surfaces in its manufacture and will allow shortening of the time required to form an information-recording surface in the molding steps. Since the variation in spacing between adjacent information-recording surfaces is about equal to the variation in film thickness of the original thermoplastic resin sheet, the use of a uniform thickness thermoplastic resin sheet will permit manufacture of a multilayered optical disk with a very low variation in spacing between adjacent information-recording surfaces (the variation in thickness of the transparent layer). That is, this invention can improve both precision and productivity.

What is claimed is:

1. An optical information-recording medium that has at least two or more different information-recording surfaces each of which has separate information previously recorded thereon in the thickness direction of a light transmitting substrate and that allows reading of the information recorded on each information-recording surface of the two or more information-recording surfaces through said substrate by varying the focal position of a playback laser beam incident on and passing through said light transmitting substrate, said light transmitting substrate having first pits corresponding to first information on one surface thereof forming an information-recording surface comprising:

a first reflecting layer formed on the information-recording surface of said light transmitting substrate;

a transparent layer that is formed onto said first reflecting layer, wherein said transparent layer is formed from a thermoplastic resin sheet having a uniform thickness above at least 20 µm in thickness and a second information-recording surface having second pits corresponding to second information, wherein said transparent layer is formed by cutting said thermoplastic resin sheet along the outer edge of said light transmitting substrate, and wherein said second pits are transferred to the surface of said thermoplastic resin sheet and the surface of said thermoplastic resin sheet is adhered to said first reflecting layer by melting the surface of said thermoplastic resin sheet, and said thermoplastic resin sheet is solidified by cooling after the surface thereof has been melted;

a second reflecting layer formed on said second information-recording surface of said transparent layer; and a protective layer formed on said second reflecting layer.

2. An optical information-recording medium as set forth in claim 1, wherein the thermoplastic resin sheet which constitutes said transparent layer has a double-pass birefringence of not more than ±50 nm and a uniform film thickness in the range of about 20 µm to about 100 µm.

3. An optical information-recording medium as set forth in claim 1, wherein the thermoplastic resin sheet has a variation in film thickness of about ±1 µm.

4. An optical information-recording medium as set forth in claim 2, wherein the thermoplastic resin sheet is selected from the group consisting of a polymethyl methacrylate "PMMA" resin, polycarbonate resin, and amorphous polyolefin.

* * * * *